Sept. 19, 1950 R. A. NORBOM 2,523,229
TRANSPORT VEHICLE FOR PULVERULENT MATERIAL
Filed June 24, 1949 3 Sheets-Sheet 1

INVENTOR.
Ragnar A. Norbom
BY
Attorney

Sept. 19, 1950  R. A. NORBOM  2,523,229
TRANSPORT VEHICLE FOR PULVERULENT MATERIAL
Filed June 24, 1949  3 Sheets-Sheet 3
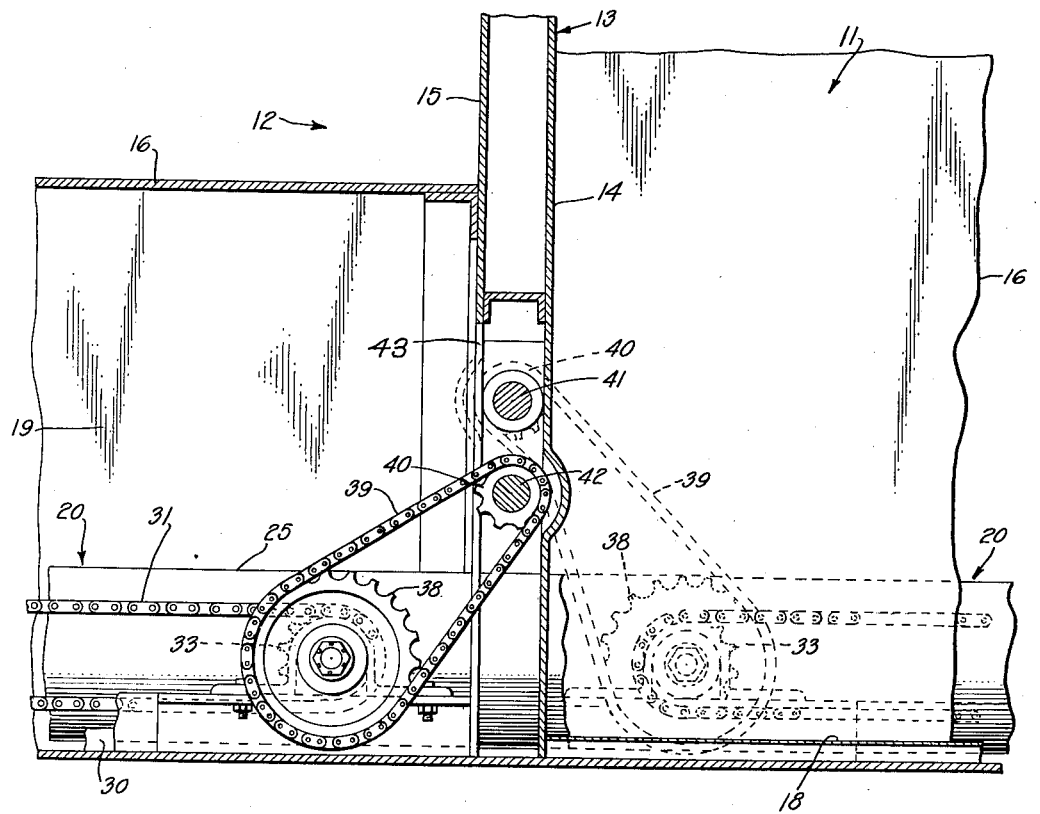
Fig.3.
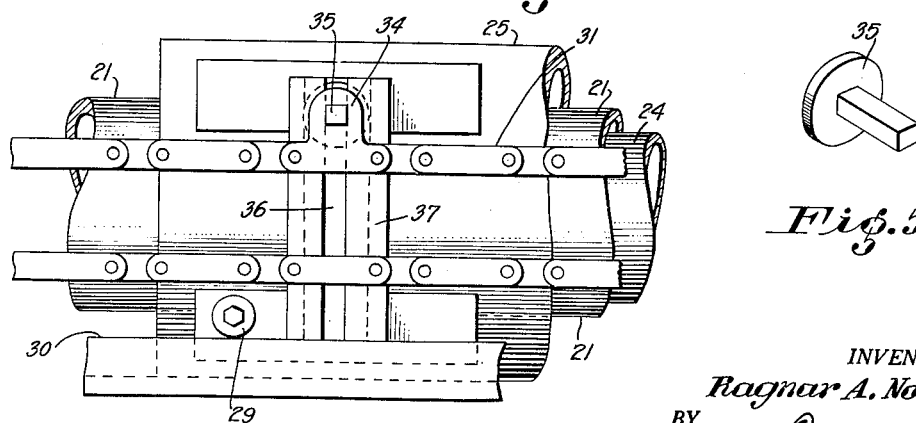
Fig.4.
Fig.5.
INVENTOR.
Ragnar A. Norbom
BY
Attorney.

Patented Sept. 19, 1950

2,523,229

UNITED STATES PATENT OFFICE 2,523,229

TRANSPORT VEHICLE FOR PULVERULENT MATERIAL

Ragnar A. Norbom, New York, N. Y., assignor to National Fitch Corporation, a corporation of Delaware Application June 24, 1949, Serial No. 101,153

5 Claims. (Cl. 214—83.28)

1

This invention relates to cargo vehicles, for use on highways or railways, for the bulk transportation of finely divided or granular material, such as flour, cereal, grain, powdered chemicals and minerals, and other similar materials capable of being entrained and conveyed in an air stream. The invention is concerned primarily with the bulk transportation of flour in a cargo vehicle capable of rapid unloading at a terminal depot by a pneumatic suction conveyor system. More particularly the invention consists in certain improvements in the cargo vehicle and system shown in U. S. Patent No. 2,440,379, issued April 27, 1948.

The vehicle illustrated in the aforesaid patent is provided with two enclosed lading compartments. For discharging the lading, each compartment has associated therewith a suction nozzle which is adapted to be attached to the intake of a pneumatic suction conveyor system located at an unloading terminal. The nozzles are extensible and mounted horizontally on the vehicle exteriorly of the compartments for extension into and movement along the bottom of their respective compartments from end to end thereof. Each nozzle is equipped with suitable mechanical mechanism driven by a separate vehicle-mounted electric motor for effecting the projection and retraction of the nozzle. Electric power for operating the motors is supplied by a suitable jumper connection to a power circuit at an unloading terminal.

Electric motors and associated electric switches, wiring, etc., are expensive. Therefore, the primary object of this invention is to eliminate the electric equipment that must be installed on a vehicle of the type above described, and drive the nozzles by means of electric motors and associated control means located at each unloading terminal. The accomplishment of such object reduces the number of electric motors required for a transportation system which utilizes the above described type of vehicles, since such a system usually is operated with more vehicles than system terminals. A further object of the invention is to provide simple inexpensive means for optionally driving both nozzles simultaneously from one terminal motor during an unloading operation, or selectively driving either of them.

Other objects and advantages of the invention

2 will be evident from the following description and accompanying drawings in which:

Figure 3 is a fragmentary sectional view taken substantially on line 3—3 of Figure 1.

Figure 4 is a fragmentary view showing details of the nozzle driving mechanism.

Figure 5 is a perspective view of one of the elements shown in Figure 4.

Figure 1:
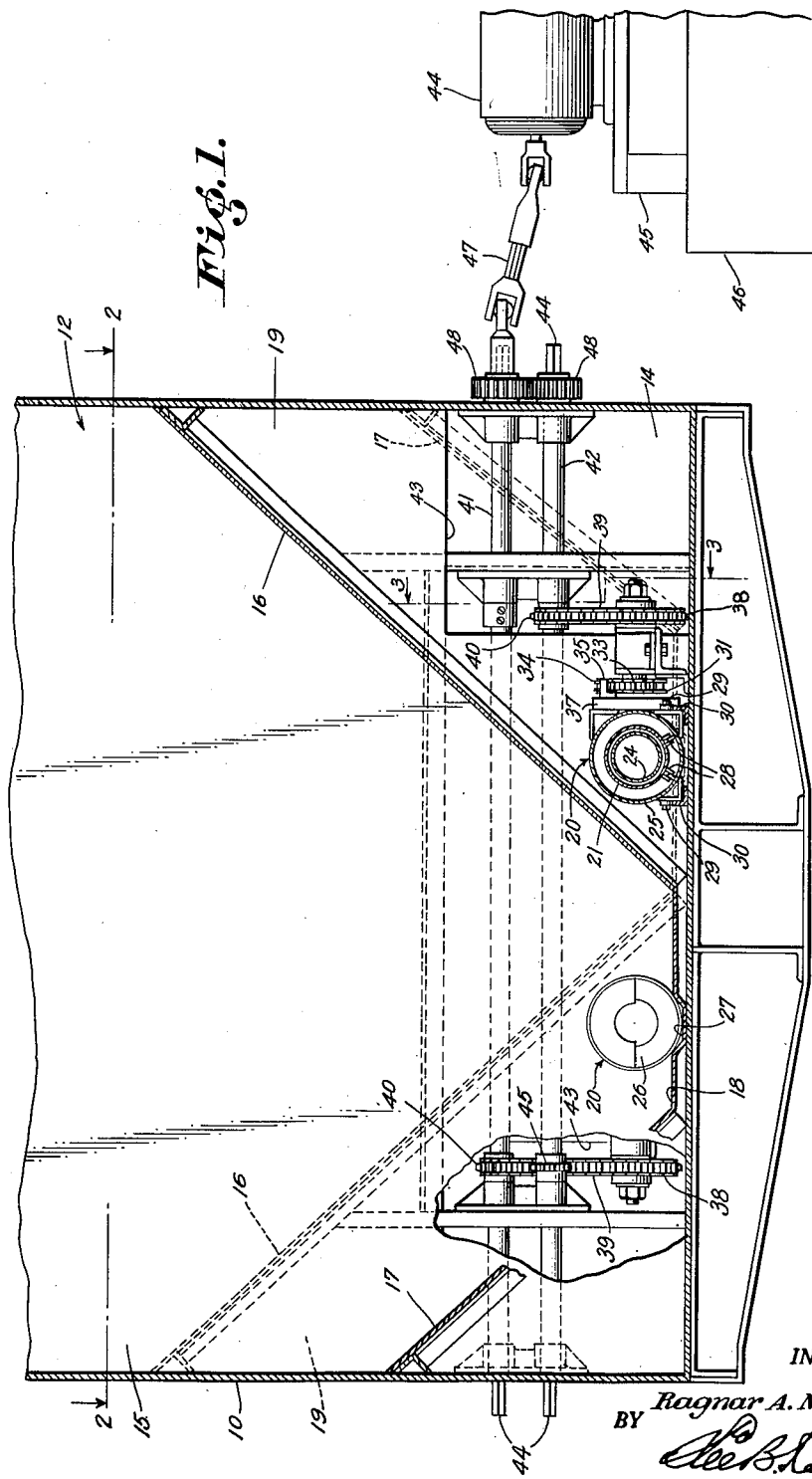
Figure 1 is a fragmentary vertical sectional view of a cargo vehicle embodying this invention. Certain portions are broken away to show details more clearly.
Figure 2:
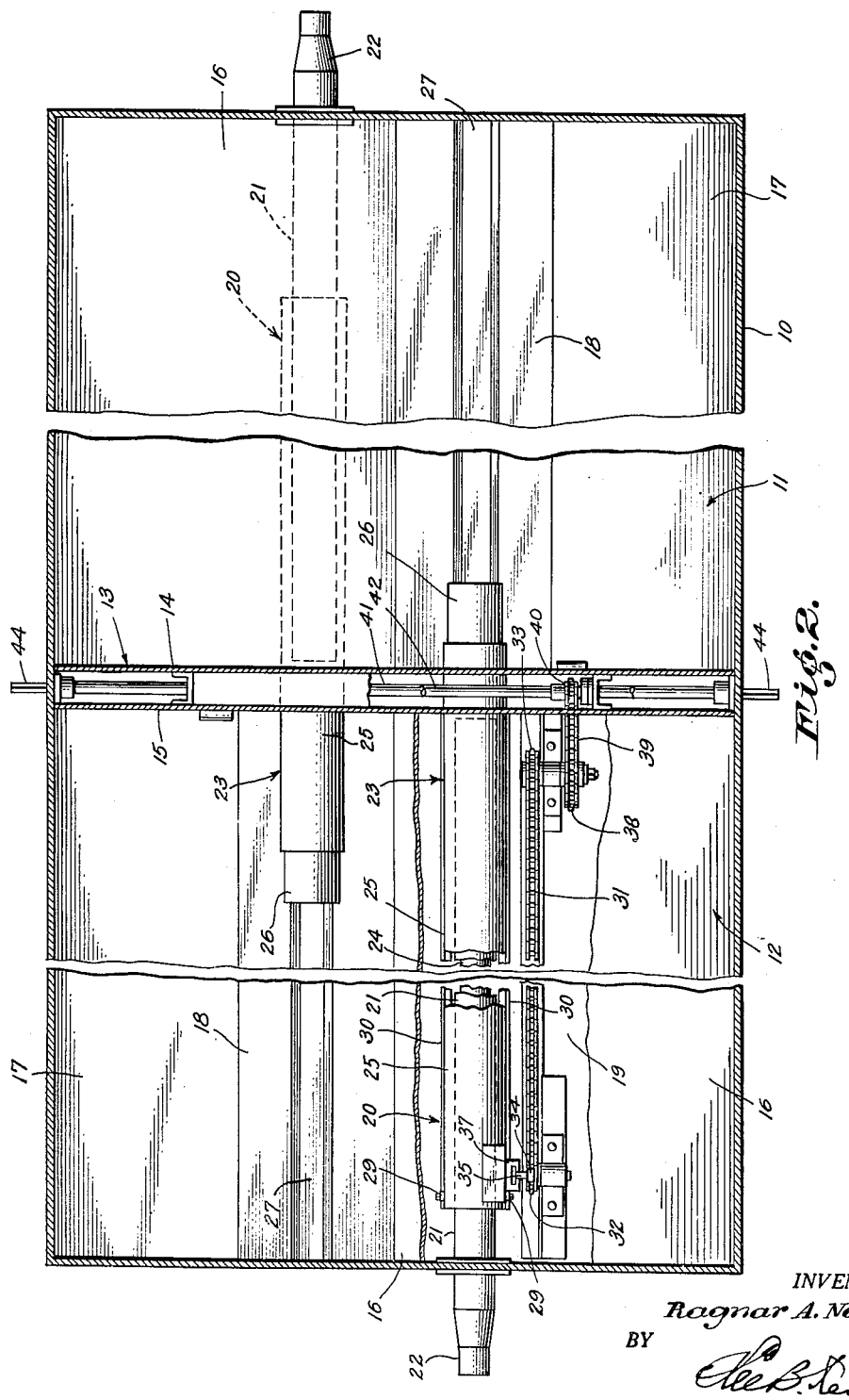
Figure 2 is a sectional view taken on line 2—2 of Figure 1 with portions broken away to show details.

Referring now to the drawings, there is shown in Figures 1 and 2 a portion of a railway vehicle, having an enclosed body 10 generally similar to that disclosed in the above mentioned patent. Enclosed within the vehicle body are two elongated lading compartments 11 and 12 of substantially equal size, one on each side of a transverse bulkhead or partition 13 (see Fig. 2) disposed in the center of the vehicle body. The bulkhead comprises two spaced walls 14 and 15 which form the adjacent end walls of the compartments 11 and 12, respectively. Each compartment is provided with filling openings (not shown), at the top, and side-wall slope sheets 16 and 17, of different inclination, which converge downwardly to a rather narrow longitudinal bottom wall 18 located to one side of the longitudinal centerline of the vehicle. The position, or inclination, of the slope sheets 16 and 17 is reversed in each compartment so that their bottom walls 18 are out of line, longitudinally of the vehicle. This construction provides enclosed triangular spaces or chambers 19 (shown best in Fig. 1) beneath the compartments 11 and 12 on opposite sides of the vehicle.

Housed in each of the chambers 19 is a longitudinally disposed extensible suction nozzle, indicated generally at 20, aligned with the bottom 18 of the compartment on the other side of the bulkhead 13. Each nozzle 20 comprises a fixed suction pipe 21, which extends from a suction-hose-connection fitting 22, located outside of the end wall of the vehicle body 10 (see Fig. 2), to a point closely adjacent the bulkhead 13, and an extensible portion 23 in the form of a double-walled tubular member, of substantially the same length as the pipe 21, which is telescopically associated therewith. The double-walled member comprises an open-ended inner tube 24 sealingly telescoped within the bulkhead-end of the pipe 20, and an outer sleeve 25 which has a diameter somewhat greater than that of the pipe 21. The tube 24 and the sleeve 25 are secured together at their forward ends to form a nozzle head 26, which is described in detail and claimed in my copending application Serial No. 86,632, filed April 11, 1949, now Patent No. 2,502,740 granted April 4, 1950. The nozzle head 26 sealingly protrudes, through a circular opening in the bulkhead 13, into the compartment on the opposite side of the bulkhead. The extensible portion 23 is so arranged that it may be advanced into the compartment and slid along in a shallow trough 27 formed centrally in the compartment bottom wall 18.

As the extensible portion 23 is advanced into the compartment, the tube 24 serves as an extension of the suction pipe 21, while the annular space between the tube 24 and the sleeve 25, and between the pipe 21 and the sleeve 25 serves as an air duct for conveying the necessary supply of material-entraining air from the chamber 19 to the intake end of the nozzle or nozzle head 26. Preferably an air filter (not shown) is provided in an outer wall of the chamber 19 to prevent contamination of the lading during an unloading operation. Since a detailed description of the intake end of the nozzle is given in the aforementioned copending application, no further description is necessary here. It is sufficient to state that the lower portion of the air duct (space between 21 and 25) is closed at its forward end, and the upper portion is extended over the intake opening of the tube 24. The duct extension also is closed at its forward end and provided with lateral openings for discharging material-entraining air.

In order to reduce sliding friction and maintain the concentric relationship between the sleeve 25 and the suction pipe 21, the underside of the bulkhead end of the pipe is provided with two radially positioned guiding rollers 28 that engage the interior surface of the sleeve 25. In addition the opposite sides of the rearward end of the sleeve 25 are provided with supporting and guiding wheels 29 which run upon parallel guide rails 30.

Certain elements of the mechanical means employed for advancing and retracting the extensible portion 23 of the nozzles into and from their respective compartments preferably are the same as those disclosed in the aforesaid Patent No. 2,440,379. Thus, an endless chain 31 is supported on two sprockets 32 and 33, one supported adjacent, and to one side of, each end of the pipe 21. Secured to the chain 31 is a driving link 34 having the laterally extending arm of a driving pin 35 engaged therein. The pin 35 has a circular head (best shown in Fig. 5) mounted for reciprocating and sliding movement in an undercut vertical groove 36 in a block 37 secured to the rearward end of the sleeve 25. Hence, the pin 35 may rotate and move vertically in the groove 36 as the link 34 passes around the sprockets 32 and 33. So long as the chain is driven, the extensible portion 23 will be moved with a reciprocating motion along substantially the full length of the bottom of the compartment in which it operates.

The chains 31 are driven by a chain drive to shafts which support their forward sprockets 33, i. e., those adjacent the bulkhead 13. Each of these sprocket shafts has a second sprocket 38 mounted thereon. A chain 39 connects each sprocket 38 to a sprocket 40 mounted on one of a pair of upper and lower horizontal, parallel shafts 41 and 42 disposed within the bulkhead 13, i. e., between the walls 14 and 15. Within each chamber 19 the corresponding adjacent wall 14 or 15 of the bulkhead 13 is provided with an opening 43, as shown in Figure 1, to accommodate the chains 39 and also to provide access to suitable bearings in which the shafts 41 and 42 are journalled. Both ends 44 of each shaft 41 and 42 are arranged to be readily accessible from the exterior of the vehicle body 10. Thus, the shaft ends may project slightly outside of the body, as shown, or be disposed (not shown) in a recess therein provided with a suitable door. The shaft ends are squared or otherwise suitably shaped for detachable connection with a source of driving power, later described. It is to be noted that an idle sprocket 45 is provided on the lower shaft 42 to permit the driving chain 39 from the upper shaft 41 to run thereover.

The terminal facilities necessary to unload the vehicle above described comprise a pneumatic suction conveyor system, with its associated suction hose (not shown) that is adapted to be connected to the fittings 22, and a source of power for turning the shafts 41 and 42. Preferably such power source is in the form of an electric motor 44 (see Fig. 1), preferably mounted so that it can be moved out of the way, when not in use. A convenient and inexpensive mounting for the motor 44 is a pallet 45 that can be moved about on an unloading platform 46, e. g., by a hoist truck. Conventional means are employed for effecting a detachable driving connection between the motor and the nozzle operating shafts 41 and 42 of the vehicle. Such means is shown as comprising a drive shaft 47 having universal joints with a splined extension joint therebetween. One end of the shaft 47 is connected to the motor shaft and the other end is provided with a socket adapted for detachable driving connection with a shaft end 44.

In operation, the vehicle is "spotted" at an unloading terminal or siding, a suction hose of the pneumatic conveyor system connected to one of the fittings 22, the motor 44 placed in position beside the vehicle, and the shaft 47 connected to a shaft end 44 corresponding to the compartment to be unloaded. Suction is established and the motor 44 started. The endless chain 31 is thus driven to impart a reciprocating motion to the extensible portion 23 of the nozzle so that the intake end of the nozzle, or nozzle head 26, moves from end to end of the selected compartment to draw in the lading together with material-entraining air which issues from lateral ports in the nozzle head. The material is thus entrained in an air stream and conveyed to a discharge point, such as a bin or other storage compartment (not shown). Complete evacuation of a compartment usually can be accomplished by several passes of the nozzle. It is pointed out that the motor 44 can be connected to the shafts 41 and 42 on either side of the vehicle, thus eliminating the necessity of positioning a certain side of the vehicle against the unloading platform 46.

In the event that simultaneous or dual evacuation of both compartments is desired, such as when both contain the same material, meshing removable gears 48 (see Fig. 1) are provided. These two gears 48, in meshing relation, are adapted to be slipped over adjacent ends 44 of both shafts 41 and 42 for driving and driven engagement therewith, so that rotation of either shaft by the motor 44 effects rotation of both shafts. Suction hoses are connected to the fittings 22 for both compartments, and the unloading operation proceeds as before described. It is evident that other mechanical means may be used, in place of the gears 48, to selectively connect the shafts 41 and 42 for driving and driven engagement.

It is apparent that various changes in the specific embodiment of the invention, as shown and described, will be evident to one skilled in the art. Therefore, the invention embraces all embodiments that come within the spirit and scope of the following claims.

I claim:

1. In a vehicle for transporting finely divided or granular material in bulk, the combination comprising: two enclosed lading compartments in end to end relation, each extending approximately one-half of the length of the vehicle and separated by a transverse partition at approximately the longitudinal center of the vehicle, said compartments having sloping side walls converging toward relatively narrow bottoms that are disposed out-of-line longitudinally of the vehicle; an extensible suction nozzle associated with each of said compartments, said nozzles being mounted on the vehicle exteriorly of said compartments for extension into and reciprocation along the bottom walls thereof to effect discharge of the lading therein; fittings on the vehicle for connecting said nozzles to a terminal source of suction; means associated with each of said nozzles for supplying material-entraining air to the intake end thereof; separate mechanical means associated with each of said nozzles for effecting reciprocation thereof in and along the bottom wall of said compartments, each said mechanical means including a transverse shaft enclosed in said partition and having both ends thereof readily accessible from the exterior of the vehicle on opposite sides thereof, and means adapting said ends for detachable driven connection to terminal motor means.

2. The combination defined in claim 1 in which the two shafts are parallel, closely spaced, and have at least one set of their adjacent ends selectively connectable for simultaneous driving and driven engagement.

3. In a vehicle for transporting finely divided material in bulk, the combination comprising: two enclosed lading compartments in end to end relation, each extending approximately one-half of the length of the vehicle and separated by a transverse double-walled partition at approximately the longitudinal center of the vehicle, said compartments having sloping side walls converging toward relatively narrow bottoms that are disposed out-of-line longitudinally of the vehicle; an extensible suction nozzle associated with each of said compartments, said nozzles being mounted on the vehicle exteriorly of their corresponding compartments beneath a sloping side wall of the other compartment for extension through said partition and reciprocation along the bottoms of their corresponding compartments to effect discharge of the lading therein; fittings on the vehicle for connecting said nozzles to a terminal source of suction; means associated with each of said nozzles for supplying material-entraining air to the intake end thereof; separate mechanical means associated with each of said nozzles for effecting the said reciprocation thereof, each said mechanical means including a horizontal transverse driving shaft journaled between the walls of said partition and having at least one end thereof readily accessible from the exterior of the vehicle and adapted for detachable driven connection to terminal motor means.

4. The structure defined in claim 3 in which the two driving shafts are parallel, closely-spaced, and have their accessible ends adjacent and connected for simultaneous driving and driven engagement by intermeshing readily-removable gears, whereby connection of one of said shaft ends to a terminal motor means permits simultaneous unloading of all the compartments and removal of said gears permits selective connection of said shaft ends to a terminal motor means in order to selectively unload said compartments.

5. The structure defined in claim 3 in which each separate mechanical means also includes a driving connection between the corresponding driving shaft and the corresponding nozzle, the walls of the partition which face the nozzle mountings beneath the said sloping sidewalls being provided with openings therein to accommodate the said driving connections and for access to the shaft journals.

RAGNAR A. NORBOM.

REFERENCES CITED

The following references are of record in the file of this patent:

UNITED STATES PATENTS

| Number | Name | Date |
|---|---|---|
| 1,374,248 | Stevens | Apr. 12, 1921 |
| 2,064,814 | Andrews | Dec. 22, 1936 |
| 2,290,460 | Winsor | July 21, 1942 |
| 2,323,458 | Dunn | July 6, 1943 |
| 2,440,379 | Norbom | Apr. 27, 1948 |

FOREIGN PATENTS

| Number | Country | Date |
|---|---|---|
| 406,145 | Great Britain | Feb. 22, 1934 |